Oct. 3, 1961        Z. R. MOCARSKI        3,002,506
VALVE
Filed Dec. 31, 1958
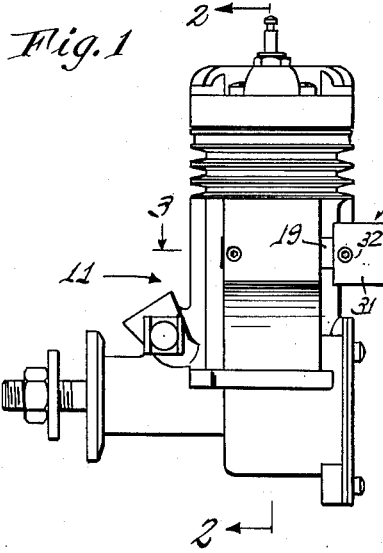
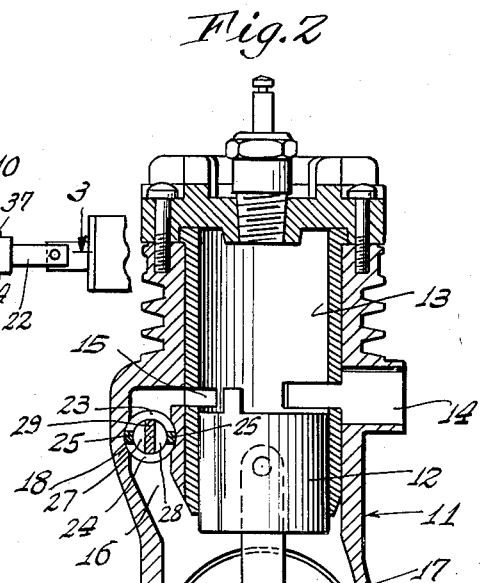
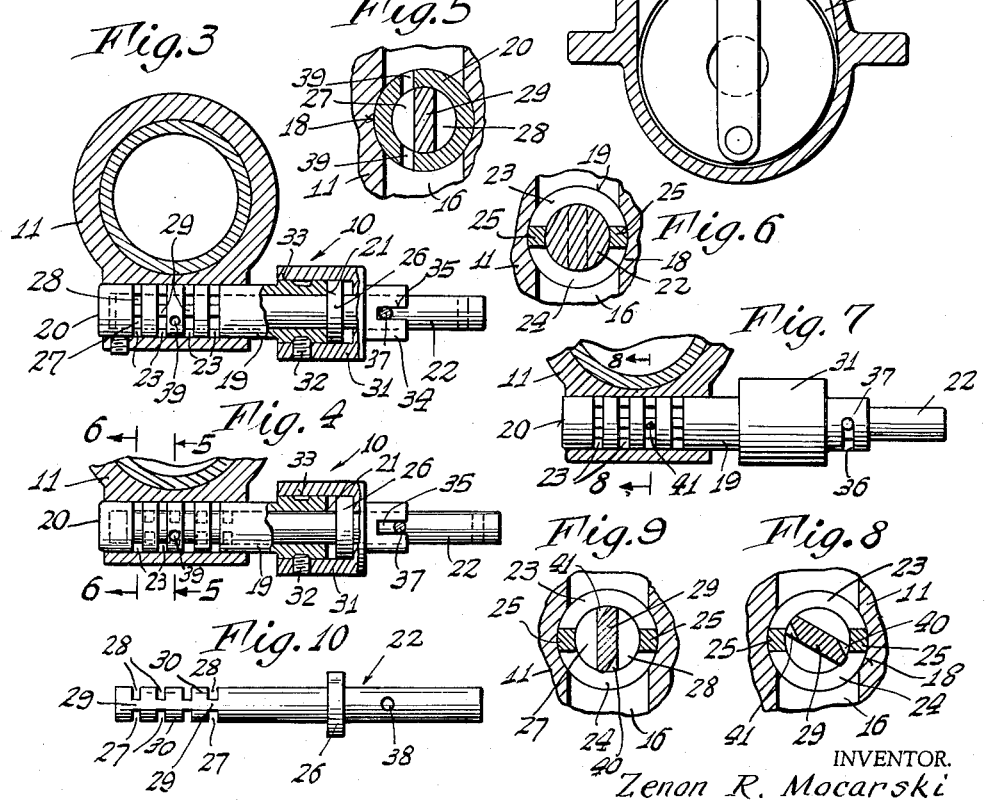
INVENTOR.
Zenon R. Mocarski
BY
Johnson and Kline
ATTORNEYS

United States Patent Office 3,002,506
Patented Oct. 3, 1961

3,002,506
VALVE
Zenon R. Mocarski, 1329 Kossuth St., Bridgeport, Conn.
Filed Dec. 31, 1958, Ser. No. 784,375
13 Claims. (Cl. 123—73)

The present invention relates to a valve that is positionable in a conduit to control the passage of fluid therethrough and more particularly to a valve that may be adjusted to be operated by either a reciprocating or a rotating movement.

The valve of the present invention has particular utility when it is connected to be operated by devices such as an electrically actuated solenoid, though of course it is capable of being employed in installations where it may be manually controlled. Since solenoids may have a rotating or a reciprocating armature, the valve of the present invention may thus be adjusted to be operated by either one. In this connection the valve is hereinafter disclosed applied to a conduit in a model airplane engine enabling the engine to be radio controlled.

An object of the present invention is to provide a valve that can be set to be operated solely by a reciprocating movement or readjusted and set to be operated solely by a rotating movement.

Another object of the present invention is to provide a valve of the above type in which in the closed position there is a controllable opening therein to permit leakage through the conduit, as for example to enable idling of a model engine.

A further object of the present invention is to provide a valve, as heretofore recited, which is composed of relatively few parts, is easily inserted into a conduit, is effective and durable in operation and is relatively economical to manufacture.

In carrying out the present invention, the valve is positionable within a conduit transverse to the flow of fluid through the conduit and specifically includes a cylindrical tubular member which is positioned perpendicular to the axis of the conduit to completely encompass the cross-section of the conduit. The tubular member has slots through which fluid may pass and to control the flow of fluid through the slots, there is provided a plug closely contained within the tubular member, that may be either rotated or axially moved to close the slots. The plug has grooves that when aligned with the slots effect the open condition of the valve.

In addition, the present invention includes leakage ports in the valve to permit a small flow of fluid through the valve even when it is positioned in the off position. The leakage ports when the valve is set for control by an axial movement are separate from the leakage ports when the valve is set for control by a rotational movement, yet the ports when rendered effective by one movement cause no interference or alter the effectiveness of the other ports when the valve is operated by the other movement.

Other features and advantages will hereinafter appear.

Referring to the drawing:

FIGURE 1 is an elevation of a model airplane engine in which the valve of the present invention may be incorporated.

FIG. 2 is a section taken on the line 2—2 of FIG. 1.

FIG. 3 is a section taken on the line 3—3 of FIG. 1, showing the valve in its open position, and set to be operated by an axial movement.

FIG. 4 is a view similar to FIG. 3 showing the valve closed.

FIG. 5 is a view taken on the line 5—5 of FIG. 4.

FIG. 6 is a view taken on the line 6—6 of FIG. 4.

FIG. 7 is a view similar to FIG. 3 showing the valve in closed position when set to be operated by a rotational movement.

FIG. 8 is a view taken on the line 8—8 of FIG. 7.

FIG. 9 is a view similar to FIG. 8 of the valve in open position.

FIG. 10 is an elevation of the plug.

Referring to the drawing, the valve of the present invention is generally indicated by the reference numeral 10 and is shown positioned in a model airplane engine 11. The engine is of the two-cycle type having a piston 12 reciprocating in a cylinder 13 having an exhaust port 14 and an inlet 15. A conduit 16 leads from the crankcase 17 of the engine to the inlet 15 and is formed with a cylindrical aperture 18 that is perpendicular to the conduit and extends completely thereacross. The valve 10 is positioned in the aperture and controls the flow of combustible mixture from the crankcase 17 to the intake port 15. It will be appreciated that in this type of engine, the combustible mixture is introduced into the crankcase, compressed therein by the piston and forced into the cylinder which forces the exhaust gases out the exhaust port 14. While the valve has been shown positioned in the intake, it will also be appreciated that it may be positioned in the exhaust port and effect a similar control over the speed of the engine by control of the exhaust gases.

Referring to FIG. 3, the valve 10 includes a tubular, cylindrical member 19 having a closed end 20 and an open end 21 and a plug 22 is positioned within the member. The tubular member 19 is provided, in the particular embodiment illustrated, with four equally spaced slots 23 on one side of the center line of the member and radially oppositely on the other side of the center line of the member four equally spaced slots 24. These slots are substantially equal in width and have an arcuate length of less than 180° to have in between complementary slots segments 25 of the tubular member. As shown in FIG. 2, the tubular member is positioned in the aperture 18 with the segments contacting the sides of the aperture 18 and accordingly any fluid through the conduit 16 must pass through the slots 24 and the slots 23.

The plug 22, as shown in FIG. 10, comprises a substantially cylindrical solid rod having an intermediate radial flange 26. Adjacent one end of the plug 22 there are formed chordal grooves 27, there being four grooves 27 located below the center line of the plug, and on the other side of the center line four identical grooves 28 are formed. Between complementary upper and lower grooves there is a substantially rectangular portion 29 while between adjacent slots on the same side of the center line the plug has cylindrical portions 30. The diameter of the plug is slightly smaller than the internal diameter of the member 19 to thereby have a close fit therewith. To provide substantially complete closure of the slots 23 and 24, the width of each slot is more than the width of each groove so that each of the cylindrical lengths 30 is wider than each slot.

The plug is positioned in the tubular member with the slots and grooves being either aligned or misaligned depending upon whether or not the flow of fluid through the valve is to be permitted or prevented, respectively. To this end there is provided a collar 31 having a setscrew 32 which engages the tubular member 19 adjacent its open end by the collar 31 receiving the end of the member in a large bore 33 formed therein. Also positioned in the bore 33 is the radial flange 26 of the plug and the bore 33 is of sufficient length to enable axial movement of the radial flange therein between engagement with the end of the bore and the end of the tubular member. The remaining portion of the plug extends through a small bore 34 in the collar to present an operating length.

The portion of the collar 31 defining the smaller bore is provided with an axial slot 35 and is also provided with a radial slot 36 of approximately one quadrant in length. The nearest edge of the radial slot 36 is approximately 90° from the axial slot 35. A pin 37 (which is preferably a threaded screw, to facilitate placing and removing thereof) threads into a threaded aperture 38 in the plug. The aperture 38 extends completely through the plug and hence the pin 37 may be positioned therein either through the axial slot 35 or the radial slot 36.

In the operation of the valve as shown in FIGS. 2–6, with the pin passing through the axial slot 35 into the aperture 38, the valve is operated solely by a reciprocating movement. The pin 37 aligns the plug 22 in the member 19 so that the rectangular portions 29 extend perpendicularly to a line connecting the segments 25.

The valve is opened when the grooves 27 and 28 of the plug are in alignment with the slots 23 and 24, such as shown in FIGS. 2 and 3. To close the valve, the plug 22 is axially moved until the radial flange 26 abuts the end of the bore in the collar (as shown FIG. 4) and in this position the cylindrical portions 30 are in alignment with the slots, thereby closing the slots and hence the valve. It will be appreciated that when the valve is operated by an axial movement, the movement by being transverse to the flow of fluid does not have to oppose the pressure of the fluid and hence little force is required to operate the valve. Of course, any intermediate position will enable control of the amount of fluid passing through the valve.

When it is desired to operate the valve of the present invention by a rotating movement, the pin 37 is removed from the aperture 38 and slot 35 and positioned in the radial slot 36 and screwed into the aperture 38. This radial slot enables only a 90° rotational movement of the plug in the tubular member and permits substantially no axial movement of the plug. In addition, with the pin 37 in the radial slot 36, the parts 19 and 22 are positioned with the slots 27 and 28 radially aligned with the grooves 23 and 24. As shown in FIG. 9, when the rectangular portions 29 are perpendicular to the segments 25, the valve is open, and a 90° turn of the plug will position the portions 29 substantially in alignment with the segments 25, which closes the valve.

As above described, the valve of the present invention can be employed to provide complete stoppage of fluid passage in a conduit; however, in certain installations such as model airplane engines, it is desirable to provide a limited passage of fluid through the conduit, as for example when it is desired to permit idling of the engine when the valve is off. To this end, the valve of the present invention provides idling passages when the valve is operated by either movement to the off position. As shown in FIG. 3, one portion of the tubular member located between adjacent grooves has a hole 39 which chordally extends completely through the tubular member. When the valve is in the off position, by an axial movement the cylindrical portions 30 are radially aligned with the slots while the portions of the tubular member between the slots are aligned with the grooves of the plug. Accordingly, the hole 39 permits fluid flow, as shown in FIG. 5, through the lower portion of the tubular member into a groove of the plug and out the uppermost portion of the tubular member, thereby enabling communication through the valve. It will be appreciated that by altering the size of the hole 39 or by covering a portion of the hole with a rectangular portion 29 that the amount of the opening may be adjusted.

When the valve is operated by a rotational movement, as shown in FIGS. 7 and 9, the plug has one rectangular section 29 which has diametrically oppositely beveled corners 40 and 41. In FIG. 8 the valve is in the off position and the beveled corners 40 and 41 provide a limited flow of fluid between them and the segments 25 to thereby enable the valve to be used for idling the engine. It will be appreciated that the size of the idling passage may be adjusted either by varying the angle of the beveled corners or by repositioning the ends of the slot 36 by adjustably rotating the collar relative to the tubular member and then by locking the setscrew 32, so that the relative position between the portions 29 and segments 25 at the off position is varied.

The idling passageway employing hole 39 is closed when the valve is operated by a rotational movement since a cylindrical portion 30 is aligned therewith. The idling passageway using the beveled corners is closed when the valve is operated by an axial movement since the beveled corners are aligned with a cylindrical portion between two grooves.

It will accordingly be appreciated that there has been disclosed a simple and effective valve which may be set to be operated by a reciprocating movement between its on and off position or may be readjusted simply by the removal and reinsertion of a pin in a different location to cause the valve to be operated between its off and on position solely by a rotational movement. Moreover, the valve in its off position may be easily provided with idling passageways with the idling passageway being effective when the valve is operated by an axial movement, being rendered inoperative when the valve is operated by a rotational movement, and the same is true of the idling passageway that is effective when the valve is operated by a rotational movement.

Variations and modifications may be made within the scope of the claims and portions of the improvements may be used without others.

I claim:

1. A valve adapted to be positioned in a conduit to control the passage of fluid therethrough comprising a tubular member having a cylindrical bore, said member being formed with a slot on one side of the center line of the member and a second slot on the opposite side of the center line of the member; a plug closely fitting in the bore comprising a cylindrical rod having at least one groove formed in the periphery on one side of the center line of the plug and a second groove formed in the periphery on the other side of the center line of the plug; and means for setting the plug to be either axially or rotatably moved to align the grooves and slots to open the valve or to be out of alignment to close the valve.

2. A valve adapted to be positioned in a conduit to control the passage of fluid therethrough comprising a tubular member having a cylindrical bore, said member being formed with a slot on one side of the center line of the member and a second slot on the opposite side of the center line of the member with the two slots being radially aligned; a plug closely fitting in the bore comprising a cylindrical rod having at least one groove formed in the periphery on one side of the center line of the plug and a second groove formed in the periphery on the other side of the center line of the plug with the two grooves being radially aligned; and means for setting the plug to be either axially or rotatably moved to align the grooves and slots to open the valve or to be out of alignment to close the valve.

3. A valve adapted to be positioned in a conduit to control the passage of fluid therethrough comprising a tubular member having a cylindrical bore, said member being formed with an arcuate slot of less than 180 degrees perpendicular to the axis of the member communicating with the bore on one side of the center line of the member and a second arcuate slot of less than 180 degrees perpendicular to the axis of the bore on the opposite side of the center line of the member with a segment of the tubular member being between adjacent ends of the slots; a plug closely fitting in the bore comprising a cylindrical rod having at least one chordal groove formed in the periphery on one side of the center line of the plug and a second chordal groove formed in the periphery on the other side of the center line of the plug with a substantially rectangular portion of the rod being between the two grooves; and means for setting the rod to be either axially or rotatably moved to align the grooves and slots to open the valve or to be out of alignment to close the valve.

4. The invention as defined in claim 3, in which there is a plurality of aligned first and second grooves of substantially equal width and substantially spaced evenly apart, and in which there is a plurality of first and second arcuate slots of substantially equal width and substantially equally spaced apart.

5. A valve adapted to be positioned in a conduit to control the passage of fluid therethrough comprising a tubular member having a cylindrical bore, said member being formed with a slot on one side of the center line of the member, a second slot on the opposite side of the center line of the member, and a hole extending chordally through the member adjacent said slot; a plug closely fitting in the bore comprising a cylindrical rod having at least one groove formed in the periphery on one side of the center line of the plug and a second groove formed in the periphery on the other side of the center line of the plug; and means for setting the plug to be either axially or rotatably moved to align the grooves and slots to open the valve or to be out of alignment to close the valve with one of the grooves being aligned with the hole when the valve is closed by axial movement of the plug to thereby provide a limited passageway through the valve when it is in the closed position.

6. A valve adapted to be positioned in a conduit to control the passage of fluid therethrough comprising a tubular member having a cylindrical bore, said member being formed with a slot perpendicular to the axis of the member communicating with the bore on one side of the center line of the member and a second slot of less than 180 degrees perpendicular to the axis of the bore on the opposite side of the center line of the member with segments of the tubular member being between adjacent ends of the slots; a plug closely fitting in the bore comprising a cylindrical rod having at least one chordal groove formed in the periphery on one side of the center line of the plug and a second chordal groove formed in the periphery on the other side of the center line of the plug with a substantially rectangular portion of the rod being between the two grooves with opposite corners of the rectangular portion being beveled; and means for setting the plug to be either axially or rotatably moved to align the grooves and slots to open the valve or to be out of alignment to close the valve with the beveled corners being positioned adjacent the segments when the valve is closed by a rotational movement of the plug to thereby provide a limited passageway through the valve when it is in the off position.

7. A valve adapted to be positioned in a conduit to control the passage of fluid therethrough comprising a tubular member having a cylindrical bore, said member being formed with a slot on one side of the center line of the member and a second slot on the opposite side of the center line of the member; a plug closely fitting in the bore comprising a cylindrical rod having at least one groove formed in the periphery on one side of the center line of the plug and a second groove formed in the periphery on the other side of the center line of the plug; and means for setting the plug to be either axially or rotatably moved to align the grooves and slots to open the valve or to be out of alignment to close the valve, said means including means for substantially preventing movement of the plug in one direction when it is set for movement in the other direction.

8. A valve adapted to be positioned in a conduit to control the passage of fluid therethrough comprising a tubular member having a cylindrical bore, said member being formed with a slot on one side of the center line of the member and a second slot on the opposite side of the center line of the member; a plug closely fitting in the bore comprising a cylindrical rod having at least one groove formed in the periphery on one side of the center line of the plug and a second groove formed in the periphery on the other side of the center line of the plug; and means for setting the plug to be either axially or rotatably moved to align the grooves and slots to open the valve or to be out of alignment to close the valve, said means including a collar on the tubular member having a length formed with a bore through which a portion of the plug passes and said length being formed with an axial slot and a radial slot communicating with the bore, and a pin removably securable to the portion of the plug and passing through the axial slot when axial movement operates the valve and through the radial slot when rotational movement operates the valve.

9. A valve adapted to be positioned in a conduit to control the passage of fluid therethrough comprising a tubular member having a cylindrical bore, said member being formed with an arcuate slot of less than 180 degrees perpendicular to the axis of the member communicating with the bore on one side of the center line of the member, a second arcuate slot of less than 180 degrees perpendicular to the axis of the bore on the opposite side of the center line of the member with a segment of the tubular member being between adjacent ends of the slots and a hole extending chordally through the member adjacent said slot; a plug closely fitting in the bore comprising a cylindrical rod being formed to have one chordal groove in its periphery on one side of the center line of the plug and a second chordal groove formed in the periphery on the other side of the center line of the plug with a substantially rectangular portion of the rod being between the two grooves and with opposite corners of the rectangular portion being beveled; and means for setting the plug to be either axially or rotatably moved to align the grooves and slots to open the valve or to be out of alignment to close the valve, said means including a collar on the tubular member having a length formed with a bore through which a portion of the plug passes, said length being formed with an axial slot and a radial slot communicating with the bore in the collar, and a pin removably securable to the portion of the plug in the collar bore, said pin passing through the axial slot when axial movement operates the valve and through the radial slot when rotational movement operates the valve, and whereby a limited passage is formed through the valve when it is operated by either movement, by the beveled corners being positioned adjacent the segments when the valve is closed by a rotational movement of the plug and by one of the grooves being aligned with the hole when the valve is closed by axial movement of the plug.

10. In combination with a reciprocating gasoline engine having a conduit communicating between a crankcase in which a combustible mixture is under pressure and a cylinder inlet, a valve adapted to be positioned in the conduit to control the passage of combustible mixture to the cylinder comprising a tubular member having a cylindrical bore, said member being formed with a slot on one side of the center line of the member and a second slot on the opposite side of the center line of the member; a plug closely fitting in the bore comprising a cylindrical rod having at least one groove formed in the periphery on one side of the center line of the plug and a second groove formed in the periphery on the other side of the center line of the plug; means for setting the plug to be either axially or rotatably moved to align the grooves and slots to open the valve or to be out of alignment to close the valve; and means forming a small passageway through the valve when it is closed to enable the engine to idle.

11. In combination with a reciprocating gasoline engine having a conduit communicating between a crankcase in which a combustible mixture is under pressure and a cylindrical inlet, a valve positioned in the conduit to control the passage of fluid therethrough comprising a tubular member having a cylindrical bore, said member being formed with a slot on one side of the center line of the member, a second slot on the opposite side of the center line of the member, and a hole extending chordally through the member adjacent said slot; a plug closely fitting in the bore comprising a cylindrical rod having at least one groove formed in the periphery on one side of the center line of the plug and a second groove formed in the periphery on the other side of the center line of the plug; and means for moving the plug to align the grooves and slots to open the valve or to be out of alignment to close the valve with one of the grooves being aligned with the hole when the valve is closed by axial movement of the plug to thereby provide a limited passageway through the valve when it is in the closed position whereby said valve when closed enables the engine to idle.

12. In combination with a reciprocating gasoline engine having a conduit communicating between a crankcase in which a combustible mixture is under pressure and a cylindrical inlet, a valve positioned in the conduit to control the passage of fluid therethrough comprising a tubular member having a cylindrical bore, said member being formed with a slot perpendicular to the axis of the member communicating with the bore on one side of the center line of the member and a second slot of less than 180 degrees perpendicular to the axis of the bore on the opposite side of the center line of the member with segments of the tubular member being between adjacent ends of the slots; a plug closely fitting in the bore comprising a cylindrical rod having at least one chordal groove formed in the periphery on one side of the center line of the plug and a second chordal groove formed in the periphery on the other side of the center line of the plug with a substantially rectangular portion of the rod being between the two grooves with opposite corners of the rectangular portion being beveled; and means for moving the plug to align the grooves and slots to open the valve or to be out of alignment to close the valve with the beveled corners being positioned adjacent the segments when the valve is closed by a rotational movement of the plug to thereby provide a limited passageway through the valve when it is in the off position whereby said valve when closed enables the engine to idle.

13. A valve adapted to be positioned in a conduit to control the passage of fluid therethrough comprising a tubular member having a cylindrical bore, said member being formed with an arcuate slot of less than 180 degrees perpendicular to the axis of the member communicating with the bore on one side of the center line of the member and a second arcuate slot of less than 180 degrees perpendicular to the axis of the bore on the opposite side of the center line of the member with a segment of the tubular member being between adjacent ends of the slots; a plug closely fitting in the bore comprising a cylindrical rod having at least one chordal groove formed in the periphery on one side of the center line of the plug and a second chordal groove formed in the periphery on the other side of the center line of the plug with a substantially rectangular portion of the rod being between the two grooves; and means for setting the rod to be either axially or rotatably moved to align the grooves and slots to open the valve or to be out of alignment to close the valve, in which there is a plurality of aligned first and second grooves of substantially equal width and substantially spaced evenly apart, in which there is a plurality of first and second arcuate slots of substantially equal width and substantially equally spaced apart, and in which the width of each slot is more than the width of each groove.

References Cited in the file of this patent

UNITED STATES PATENTS

| Number | Name | Date |
|---|---|---|
| 89,399 | Gilbert | Apr. 27, 1869 |
| 375,508 | Rodman | Dec. 27, 1887 |
| 893,026 | Sletten | July 14, 1908 |
| 918,211 | Snyder | Apr. 13, 1909 |
| 1,469,612 | Bahr | Oct. 2, 1923 |
| 1,484,643 | Hansen | Feb. 26, 1924 |
| 1,760,737 | Boden | May 27, 1930 |
| 2,141,428 | Carrol | Dec. 27, 1938 |
| 2,202,216 | Madsen | May 28, 1940 |
| 2,556,780 | Shryock | June 12, 1951 |